(12) United States Patent
Baney et al.

(10) Patent No.: US 6,470,105 B2
(45) Date of Patent: Oct. 22, 2002

(54) BISTABLE LIGHT PATH DEVICE

(75) Inventors: Douglas M. Baney, Los Altos; Wayne V. Sorin, Mountain View, both of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 33 days.

(21) Appl. No.: 09/755,527

(22) Filed: Jan. 5, 2001

(65) Prior Publication Data

US 2002/0090189 A1 Jul. 11, 2002

(51) Int. Cl.$^7$ ................................................. G02B 6/42
(52) U.S. Cl. ............................ 385/16; 385/31; 385/129
(58) Field of Search ................................. 385/16, 11, 1, 385/2, 8, 9, 31, 39, 40, 129, 130, 131

(56) References Cited

U.S. PATENT DOCUMENTS

| | | | |
|---|---|---|---|
| 3,963,310 A | | 6/1976 | Giallorenzi et al. |
| 4,278,327 A | * | 7/1981 | McMahon et al. .......... 349/197 |
| 5,361,320 A | | 11/1994 | Liu et al. |
| 5,630,004 A | * | 5/1997 | Deacon et al. ................ 385/10 |
| 6,157,753 A | * | 12/2000 | Baney et al. ................ 385/122 |
| 6,208,774 B1 | * | 3/2001 | Sorin et al. ................ 349/196 |

FOREIGN PATENT DOCUMENTS

| | | |
|---|---|---|
| EP | 1 054 288 | 11/2000 |
| EP | 1 061 406 | 12/2000 |

OTHER PUBLICATIONS

Mitsuishi, Masaya et al. "Optical Switching of a Metal–Clad Waveguide with a Ferroelectric Liquid Crystal", Applied Optics, vol. 36, No. 35, Dec. 10, 1997, pp. 9225–9229.

Heridan, J. P., "Electro–Optically Induced Deflection in Liquid–Crystal Waveguides", Journal of Applied Physics, vol. 45, No. 12, Dec. 1974, pp. 5160–5163.

* cited by examiner

*Primary Examiner*—Rodney Bovernick
*Assistant Examiner*—Sung Pak

(57) ABSTRACT

Bistable switchable waveguide includes a guide layer constructed from a layer having a first index of refraction when the molecules of the material are aligned in a first direction and a second index of refraction when the molecules are aligned in a direction orthogonal to the first direction. The guide layer is sandwiched between first and second surfaces that are in contact. The first surface causes the molecules of the guide layer adjacent to it to be aligned in the first direction. The second surface also includes a third region in which the second surface causes the molecules of the guide layer adjacent to it to be aligned in a second direction. The waveguide has first and second electrodes for causing the molecules of the guide layer to be aligned in a second direction that is the second direction in a region bounded by the third region and first surface.

6 Claims, 4 Drawing Sheets

BISTABLE LIGHT PATH DEVICE

FIELD OF THE INVENTION

The present invention relates to light guides, and more particularly, to light guides based on liquid crystals.

BACKGROUND OF THE INVENTION

Data communication systems based on fiber optics provide substantially higher bandwidth than systems based on electrical systems. Unfortunately, switching devices for switching optical signals between an input fiber and a plurality of output fibers have not kept pace. As a result, optical signals are typically converted back to electrical signals prior to switching. The electrical signals are then switched using conventional packet switching techniques and reconverted to optical signals prior to entering the output fibers. The limitations of electrical switching systems prevent the realization of the full data bandwidth of the fibers. Accordingly, a significant amount of research has gone into developing optical switches that avoid the conversion of the light signals back to electrical signals.

One promising method for switching optical signals between optical paths relies on a waveguide whose location is electrically controlled. A waveguide may be generated by altering the index of refraction of a medium along the path over which the light is to travel such that the desired path has a higher index of refraction than the surrounding medium. Devices based on liquid crystals are particularly attractive because of the large change in index of refraction for light of a predetermined polarization that can be induced in a liquid crystal layer by applying a low frequency AC electrical field across the layer. A simple switching device can be constructed by energizing one set of electrodes on the surface of the liquid crystal layer while leaving an alternative set in a non-energized state. The region between the energized electrodes then becomes the waveguide that specifies the direction in which the light signal will propagate in the liquid crystal layer.

The AC field across the layer must be maintained to maintain the light path. If power is interrupted, the waveguide will disappear and the device will cease to operate. This increases the power requirements associated with the optical path and prevents the deployment of such light guides at system locations that are subject to power failures.

Broadly, it is the object of the present invention to provide an improved optical switching element.

It is a further object of the present invention to provide an optical switching element that does not require power to be continually applied in order to operate.

These and other objects of the present invention will become apparent to those skilled in the art from the following detailed description of the invention and the accompanying drawings.

SUMMARY OF THE INVENTION

The present invention is a bistable switchable waveguide having first and second states. The waveguide guides light along a predetermined path in the first state while providing no guiding of the light in the second state. The waveguide includes a guide layer constructed from a layer of a material having a first index of refraction when the molecules of the material are aligned in a first direction and a second index of refraction when the molecules are aligned in a direction orthogonal to the first direction. The guide layer is sandwiched between first and second surfaces that are in contact with the guide layer. The first surface causes the molecules of the guide layer adjacent to the first surface to be aligned in the first direction. The second surface has first and second regions in which the second surface causes the molecules of the guide layer adjacent to the second surface to be aligned in the first direction. The second surface also includes a third region in which the second surface causes the molecules of the guide layer adjacent to the second surface to be aligned in a second direction. The waveguide has first and second electrodes for causing the molecules of the guide layer to be aligned in a second direction that is the second direction in a region bounded by the third region and the first surface. The waveguide may also includes third and forth electrodes for causing the molecules of the guide layer to be aligned in a direction parallel to the first direction in a region bounded by the third region and the first surface. The guide layer is preferably constructed from a liquid crystal material.

DETAILED DESCRIPTION OF THE INVENTION

Figure 1:
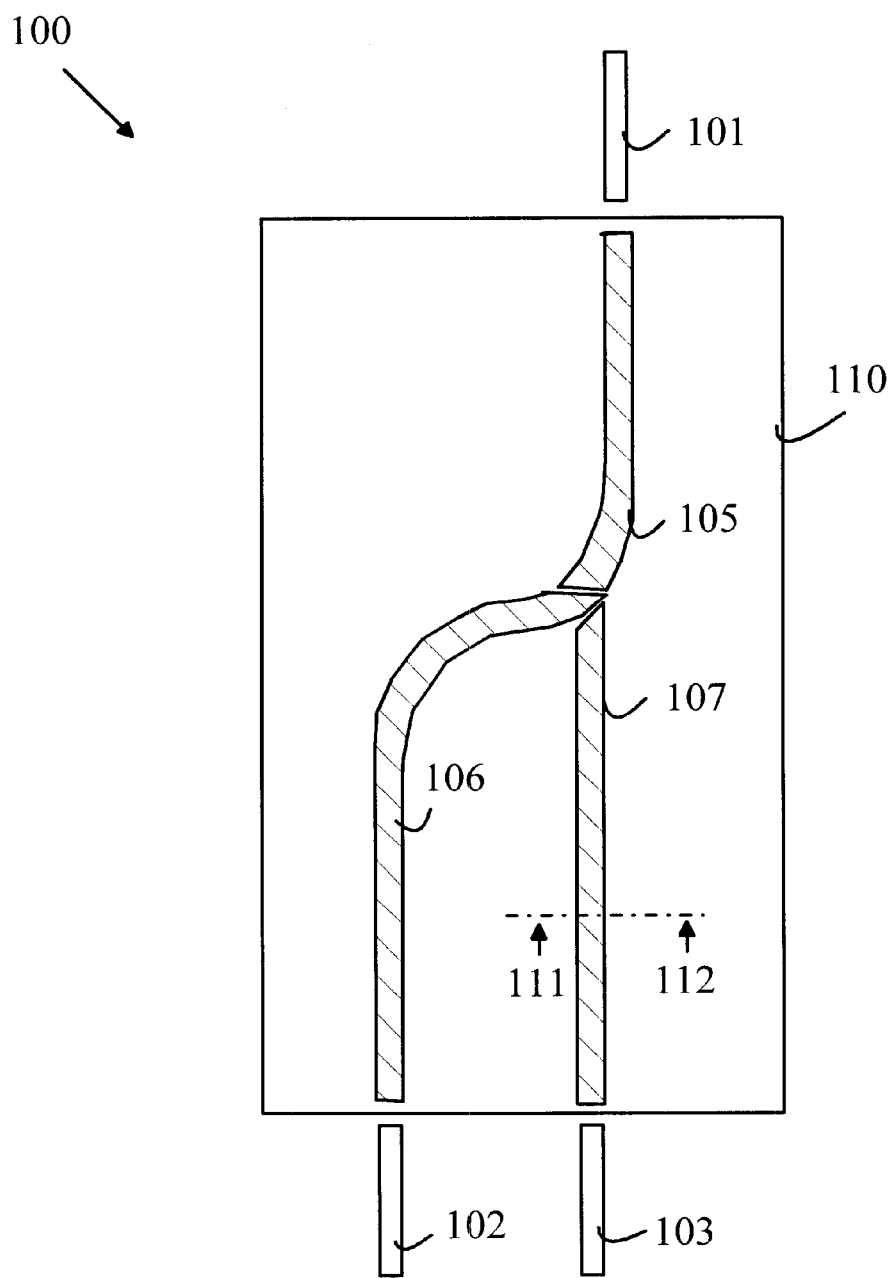
FIG. 1 is a top view of a prior art switching device 100 for switching light signals from an input fiber 101 to either fiber 102 or 103.

The manner in which the present invention provides its advantages may be more easily understood with reference to FIG. 1, which is a top view of a prior art switching device 100 for switching light signals from an input fiber 101 to either fiber 102 or 103. The switch utilizes a liquid crystal layer 110 in which two paths may be defined by applying an appropriate potential on electrodes 105–107. The first path connects fibers 101 and 102 by generating a light guide under electrodes 105 and 106. The second path connects fibers 101 and 103 by generating a guide under electrodes 105 and 107.

Figure 2:
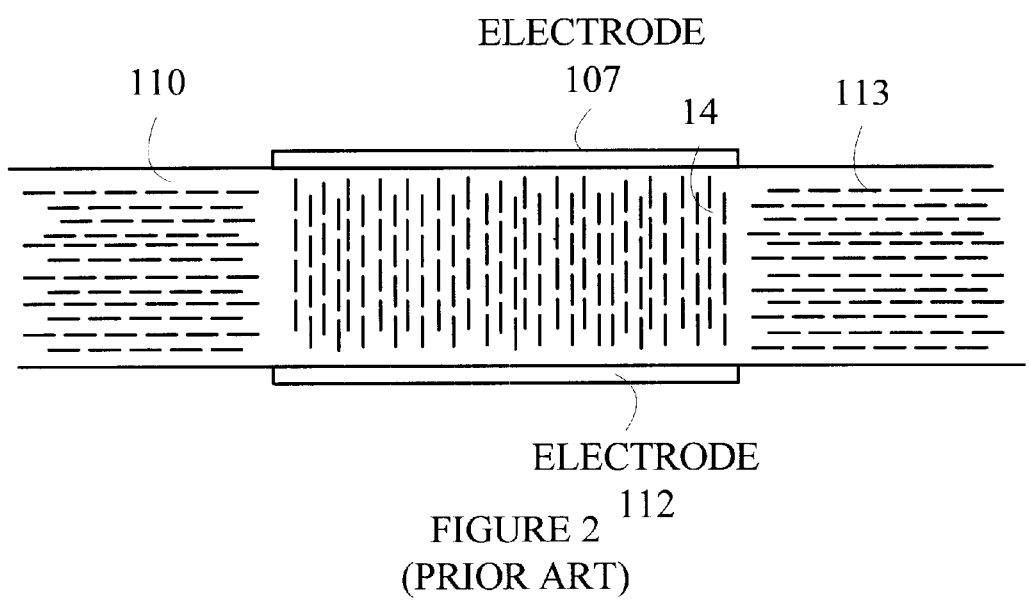
FIG. 2 is cross sectional view of the switching arrangement shown in FIG. 1 through line 111–112.

Refer now to FIG. 2 which is a cross sectional view of the switching arrangement shown in FIG. 1 through line 111–112. The liquid crystal waveguide operates by creating a region under an energized electrode in which the index of refraction is greater than that in the surrounding liquid crystal medium. An AC field is applied across a portion of a liquid crystal layer 110 to change the orientation of the liquid crystal molecules in the applied field as shown at 14. Coupling an appropriate signal generator between electrodes 107 and 112 generates this field. A liquid crystal alignment layer is applied to the walls of the chamber that causes the crystals to be aligned as shown at 113 in the absence of an electric field. When an electric field is applied, the liquid crystals that are not in contact with the crystals on the walls are re-oriented to the direction of the electric field. When the field is removed, the liquid crystals reorient themselves with the crystals in contact with the walls of the chamber. An AC field is utilized to switch the direction of orientation because a DC field would result in the ions within the liquid crystals drifting toward one of the electrodes over time.

Thus the generation of an electric field between the electrodes results in a region that has a higher index of refraction for light having a polarization that is perpendicular to the orientation direction of the liquid crystals, and hence, light of this polarization passing through this region will be guided. A polarization filter may be utilized to assure that only light of the desired polarization is present. When the field is not applied, there is no light guiding effect.

The generation of the liquid crystal alignment layer is well known in the art, and hence, will not be discussed in detail here. For the purposes of the present invention, it is sufficient to note that the walls of the chamber can be textured such that the molecules of the liquid crystal will assume a specific orientation at the wall. For example, if the molecules are to assume an orientation parallel to the wall surface, the wall surface can be coated with a material that is then textured by rubbing to produce small grooves. The liquid crystal molecules will align themselves in the grooves, provided the material is one with which the liquid crystals will wet the wall surface. If a non-wetting coating material is utilized, the liquid crystal molecules will align themselves perpendicular to the wall to minimize the interactions with the wall.

Figure 3:
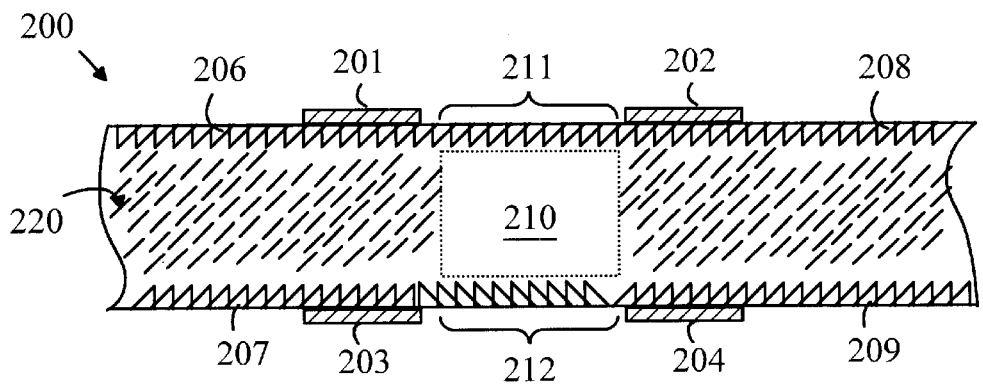
FIG. 3 is a cross-sectional view of one embodiment of the present invention of a switching element 200 according to the present invention.

Refer now to FIG. 3. which is a cross-sectional view of one embodiment of a bistable waveguide element 200 according to the present invention. Waveguide 200 operates by creating a region 210 in which the liquid crystal alignment has two stable orientations. In the regions outside of region 210, i.e., regions 206–209. the walls of the chamber are textured such that the liquid crystals are aligned at an angle of +45 degrees with respect to the wall as shown at 220. The texturing can be created by conventional lithographic techniques. The textured surface is coated with an appropriate wetting agent to assure that the liquid crystal molecules will align themselves with the textured surface. Since these regions induce the same alignment, the liquid crystal molecules will always take on this +45 degree alignment in the absence of an electric field.

Figure 4:
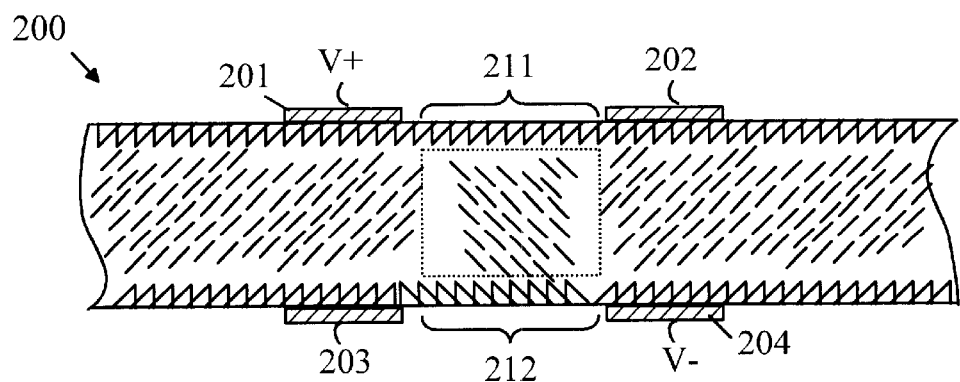
FIGS. 4 and 5 are cross-sectional views of waveguide 200 when different switching fields are applied using pairs of electrodes.
Figure 5:
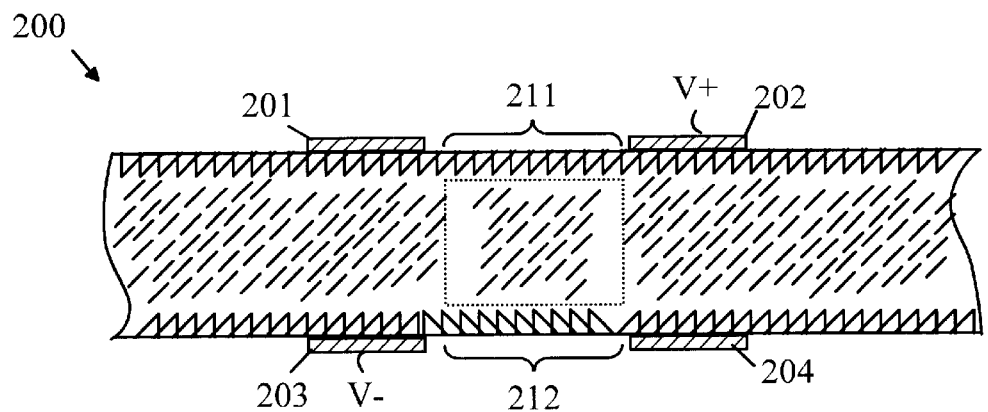

Region 210 differs from regions 206–209 in that the texturing on the opposite walls of the waveguide favor different liquid crystal orientations. For example, region 211 induces a +45 degree orientation, and region 212 induces a –45 degree orientation in the absence of an electric field. Electrodes 201–204 are utilized to provide a temporary electric field that causes the liquid crystals in region 210 to orient themselves at an angle that is approximately either +45 degrees or –45 degrees. The electrodes are used in pairs as shown in FIGS. 4 and 5, which are cross-sectional views of waveguide 200 when different switching potentials are applied. It should be noted that the field need only be applied for a short period of time, and hence, a DC field may be utilized. When the electric field is removed, the combination of the bulk interaction of the liquid crystal molecules and the surface interaction on the wall favoring the chosen orientation results in the liquid crystals remaining aligned to that wall in region 210.

Figure 6:
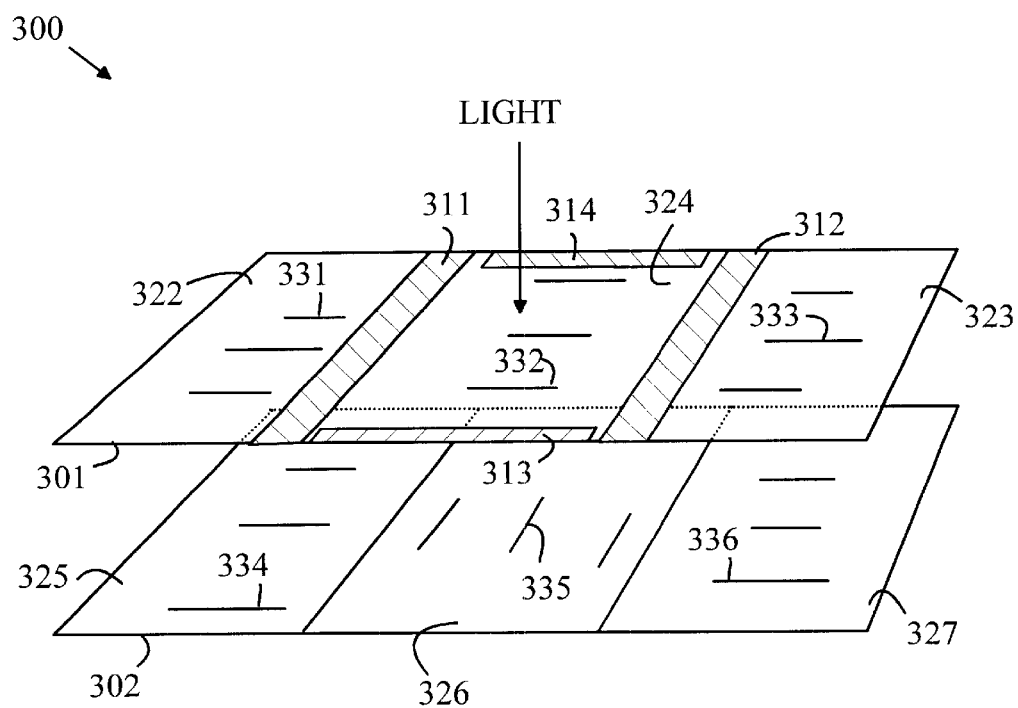
FIG. 6 is a perspective view of another embodiment of a bistable lightguide according to the present invention.

Refer now to FIG. 6, which is a perspective view of another embodiment of a bistable lightguide according to the present invention. Lightguide 300 has walls 301 and 302 that are textured to control the orientation of the liquid crystal molecules in the absence of an applied electric field. Wall 301 is divided into three sections shown at 322–324, and wall 302 is divided into sections 325–327. The sections are textured so as to reinforce alignment of the liquid crystal molecules in the directions shown at 331–336. The bistable section between wall sections 324 and 326 will support either orientation of the liquid crystal molecules. The orientation of the liquid crystal molecules in the bistable section is set by applying a potential across electrodes 311 and 312 or electrodes 313 and 314. As discussed above, when the potential is removed, the liquid crystals will remain in the induced alignment.

The wall sections of the bistable region are transparent in this embodiment of the present invention. Light enters the bistable region in a direction perpendicular to wall section 324. Assume that the polarization of the light is oriented in a direction parallel to that shown at 335. If the bistable section has been set such that the liquid crystal molecules are also oriented in this direction, then the light will be guided through the bistable section and exit via wall segment 326. If, on the other hand, the liquid crystal molecules are oriented in a direction parallel to that shown at 332, there will be no difference in the index of refraction with respect to the surrounding sections of the guide, and hence, the light beam will not be guided. If the distance between walls 301 and 302 is sufficiently large, the unguided light beam will disperse, and hence, very little light will exit via wall section 326.

Various modifications to the present invention will become apparent to those skilled in the art from the foregoing description and accompanying drawings. Accordingly, the present invention is to be limited solely by the scope of the following claims.

What is claimed is:

1. A bistable switchable waveguide having first and second states, said waveguide guiding light along a predetermined path in said first state, said waveguide comprising:

a guide layer comprising a layer of a material having a first index of refraction when the molecules of said material are aligned in a first direction and a second index of refraction when said molecules are aligned in a second direction;

first and second surfaces in contact with said guide layer, said guide layer being sandwiched between said first and second surfaces, said first surface causing said molecules of said guide layer adjacent to said first surface to be aligned in said first direction, and said second surface having first and second regions in which said second surface causes said molecules of said guide layer adjacent to said second surface to be aligned in said first direction, said second surface further comprising a third region in which said second surface causes said molecules of said guide layer adjacent to said second surface to be aligned in said second direction; and first and second electrodes for causing said molecules of said guide layer to be preferentially aligned in said second direction in a region bounded by said third region and said first surface.

2. The waveguide of claim 1 wherein said first direction is orthogonal to said second direction.

3. The waveguide of claim 1 further comprising third and forth electrodes for causing said molecules of said guide layer to be aligned preferentially in said first direction in a region bounded by said third region and said first surface.

4. The waveguide of claim 1 wherein said material comprises liquid crystals.

5. The waveguide of claim 1 wherein said second surface is transparent to said light in said third region.

6. The waveguide of claim 1 wherein said first and second electrodes are disposed on the same side of said guide layer, said third region being located between said first and second electrodes.

* * * * *